United States Patent [19]

Wessels et al.

[11] 3,893,163

[45] July 1, 1975

[54] METHOD OF RECORDING A VIDEO SIGNAL

[75] Inventors: Johannes Hendrik Wessels; Willem van den Bussche, both of Emmasingel, Eindhoven, Netherlands

[73] Assignee: U.S. Philips Corporation, New York, N.Y.

[22] Filed: Mar. 26, 1973

[21] Appl. No.: 344,863

[30] Foreign Application Priority Data

Sept. 2, 1972 Netherlands ........................ 7212003

[52] U.S. Cl. ........................................ 358/4; 358/12

[51] Int. Cl. ........................... H04n 5/76; H04n 9/02

[58] Field of Search ........ 178/5.2 R, 5.4 R, 5.4 CD, 178/6.6 A; 325/142; 358/4, 12

[56] References Cited

UNITED STATES PATENTS

| | | | |
|---|---|---|---|
| 3,535,433 | 10/1970 | Arimura et al. | 178/5.4 CD |
| 3,622,693 | 11/1971 | Del Ciello et al. | 178/5.4 CD |
| 3,626,087 | 12/1971 | Tomioka | 178/5.4 CD |

*Primary Examiner*—Richard Murray

*Attorney, Agent, or Firm*—Frank R. Trifari; Simon L. Cohen

[57] ABSTRACT

Method of recording a video signal, in particular a colour video signal, on a record carrier, in which method a combined signal is produced which contains a carrier which is modulated in frequency by the luminance information, and a subcarrier which lies below the frequency band of this modulated carrier and is modulated, for example, by the colour information. The zero crossings of the ascending and descending edges of the modulated carrier are shifted in opposite dependence upon the modulated subcarrier and recorded on the record carrier as information-containing quantities.

20 Claims, 9 Drawing Figures

METHOD OF RECORDING A VIDEO SIGNAL

Figure 1:
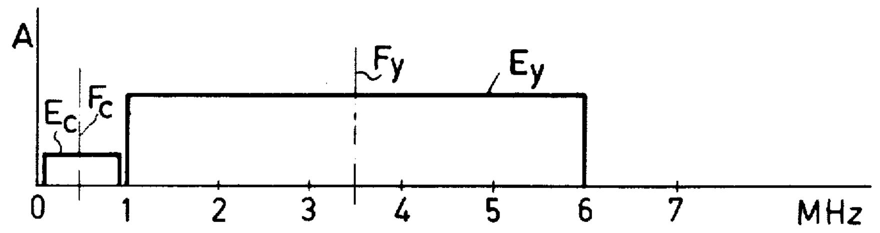

The invention relates to a method of recording a video signal, in particular a color video signal, on a record carrier, in which method a combined signal is generated which comprises a carrier which is modulated in frequency by the luminance information of the video signal and at least one further carrier which lies below the frequency band of the modulated carrier and is modulated by a further associated information component.

This method is known in recording a color video signal on a magnetic record carrier, in particular a magnetic tape, the further carrier being modulated by the colour information of the video signal. As is described, for example, in Netherlands Patent Application No. 7,009,602 the modulated color carrier is superposed on the modulated carrier and the resulting signal is recorded on the magnetic record carrier, the modulated carrier acting effectively as a bias magnetization signal for the modulated color carrier.

Consequently, the signal ultimately obtained by means of such a method and recorded on the magnetic record carrier shows both frequency variations and amplitude variations. This means that this known manner of recording can only be used with record carriers provided with a signal code which enables amplitude variations of the signal to be recorded and subsequently read out.

However, some signal carriers use signal coding which permits only two signal levels on the record carrier. As an example we may mention a disk-shaped record carrier described in U.S. application Ser. No. 229,285, filed Feb. 25, 1972, on which the information is recorded in a spiral track in the form either of a black-and-white pattern or of a high-low structure, the said track being scanned by means of a beam of radiation. It will be evident that when such a method of signal coding is used amplitude variations of the signal cannot be recorded, so that the known method of recording cannot be used.

In the case of record carriers, such as magnetic tape, employing a code which does permit variations in signal amplitude to be recorded and hence allows the method of recording mentioned at the beginning of this specification to be used, it also is meaningful to use a signal code which does not require recording and reproduction of amplitude variations, for this has the advantage that undesirable amplitude variations exert no disturbing influence, because in such a signal code system the signal amplitude contains no essential information. In the known method of recording in which the amplitude of the recorded signal contains the color information, signal amplitude variations obviously will be disturbing, so that generally an automatic control signal is used which, as the case may be in conjunction with a pilot signal, ensures that the signal read from the record carrier always has the correct amplitude in that undesirable amplitude variations are compensated. When a signal code system is used in which the amplitude of the recorded signal does not play a role, the said automatic control system can obviously be dispensed with.

It is an object of the present invention to provide a method and an arrangement for carrying out the method by means of which a video signal which comprises luminance information, color information and/or sound information can be recorded on a record carrier according to a code system in which the signal amplitude does not play a role.

The method according to the invention is characterized in that the passages through zero, or zero crossings, of the ascending and descending edges of the modulated carrier are shifted in mutually opposite dependence upon the modulated further carrier (or further carriers) and are recorded on the record carrier as information-containing quantities.

The associated information component may, for example, be the associated color information or the associated sound information, which latter information in turn may comprise several components, for example for obtaining a stereophonic or even quadrophonic sound signal.

The invention is based on the recognition that the said method of recording provides a signal recorded on the record carrier in which at the locations of the zero crossings both the luminance information and the further information component are recorded so that subsequent reading of this information may readily be effected by means of suitable filters.

Shifting the zero crossings of the modulated carrier may be performed in various manners. For example, variable delay lines may be used to which the modulated carrier is applied and the delay times of which are determined by the amplitude of the modulated further carrier. In this embodiment a distinction must be made between the zero crossing of the ascending edge and that of the descending edge of the modulated carrier, because these crossings must be shifted in opposite directions in accordance with the modulated further carrier. Hence, the sign of the edge slope also is to be detected to ensure correct shifts of the zero crossings.

The desired shifting of the zero crossings of the modulated carrier may alternatively be simply achieved by ensuring according to a further feature of the invention that the modulated carrier has finitely steep edges and by adding the modulated further carrier to this modulated carrier to form a sum signal the zero crossings of which are recorded on the record carrier as information-containing quantities. Thus, only the positions of the zero crossings are required to be unambiguously fixed on the record carrier. The term "zero crossings" is to be understood to mean the instants at which the sum signal assumes a value midway between the peak values of the modulated carrier. If the modulated carrier is a signal which is symmetric about zero voltage, the said value in reality corresponds to this zero voltage. However, the modulated carrier wave may also contain a direct-voltage component, which then must be regarded as zero level.

Preferably a modulated carrier is used the slope of which has a constant value over a maximum amplitude range around the zero level, for this amplitude range in which the slope is constant determines in general the permissible amplitude of the modulated further carrier to be added to this carrier, because only a level shift within this amplitude range results in shifts of the zero crossings which are linearly dependent upon the value of this level shift and hence are linearly dependent upon the modulated further carrier, because the latter produces the level shift. In this respect the most suitable shape for the first carrier would be a triangular signal, for this has a constant slope in the entire range. However, sometimes a certain non-linear dependence of the shift of the zero crossings upon the further carrier may be desirable, for example in order to compensate for other non-linearities in the recording and playback processes.

It is found, however, that when a linear dependence is desired there is no objection to the modulated carrier being a sinusoidal signal, provided that the amplitude of the modulated further carrier to be added to it is not excessive. In this manner the mixed products due to the non-linearities remain small enough to be tolerated.

Furthermore, in forming the sum signal it is important to ensure that at least at the zero crossings the modulated carrier has a fixed slope at any frequency, in order that the shift of these zero crossings in accordance with the modulated further carrier shall be the same for any frequency of the modulated carrier. This is simply obtainable, at least to a reasonable approximation, by causing the carrier, after it has been modulated by the luminance information, to pass through a low-pass filter. The use of a low-pass filter may in any case be desirable or even necessary for some other reason, for frequently the carrier is a square-wave signal having very steep edges which is produced by an astable multivibrator. Because a modulated carrier having finitely steep edges is required for the formation of a suitable sum signal, such as a square-wave signal must be converted into a signal having less steep edges, and this may simply be achieved by means of a low-pass filter. By causing the carrier to be first modulated in frequency by the luminance information and then to be applied to the low-pass filter both purposes are simultaneously achieved.

Various signal code systems may be used in recording the signal. For example, the zero crossings of the sum signal may be detected, a peak signal being recorded on the record carrier at instants which correspond to these zero crossings. Also, by means of the detected zero crossings there may be recorded on the record carrier a square-wave signal which always is in one of two possible states, the transition from one state to the other and vice versa taking place at instants which correspond to the zero crossings of the same signal.

When the latter signal code system is used the sum signal may advantageously be applied to a limiter which provides an output signal which is equal to the applied sum signal as long as the absolute value of this signal is smaller than a given limit value, and which is equal to this limit value when the absolute value of the sum signal exceeds this limit value. If the limit value is made comparatively small with respect to the maximum value of the, possibly amplified, sum signal, in this method a substantially square-wave signal is obtained which, possibly after amplification, may directly be used for recording on the record carrier.

When a color video signal is to be recorded the further information component will in general be the color information. If, however, a monchrome video signal is concerned, this further information component may be the audio information, which provides the advantage that this audio information requires no separate track or the like.

when a color video signal is recorded in a manner in which the color information is recorded according to the aforementioned method, the audio information associated with the video signal may be recorded in any of a plurality of known manners, for example in a separate track or in sampled form during the horizontal flyback periods of the video signal being recorded. When using the method according to the invention, however, the audio information be recorded in a manner identical with that employed for the color information in that it is caused to modulate a sound carrier which lies below the frequency band occupied by the modulated carrier and outside the frequency band occupied by the modulated color carrier, the modulated audio carrier together with the modulated color carrier being added to the modulated carrier to obtain the sum signal.

When a standard color video signal is used in which the carriers for the luminance information, the color information and the sound information are spaced apart by fixed distances, according to a further method according to the invention the modulated color carrier and the modulated audio carrier may be obtained by mixing the color and audio signals present in the standard color video signal with a common mixing signal. In the reproduction of the recorded color video signal the two components may be reconverted to the original frequency bands by means of a common mixing signal. This has the advantage that the reconverted audio signal has the same stability as the reconverted color signal, the stability of which latter signal obviously has to satisfy stringent requirements which are complied with by coupling the mixed frequency to the line frequency or to the color carrier of the standard colour video signal.

A disadvantage of the aforedescribed method is the comparatively large distance by which in general the color signal and the audio signal of a standard color video signal are spaced from one another, which implies that the two converted sound and color carriers together require a comparatively wide frequency band. This disadvantage may be obviated by chosing a frequency for the mixing signal which lies between that of the color signal and that of the audio signal. In the reconversion process a filter is required to eliminate a lower side band (mirror) of the audio signal which is produced during demixing.

The frequency of the mixing signal preferably is chosen so that the mixed products which are produced during recording, and in particular the second-order lower sideband, have the lowest possible disturbing influence during the reproduction of the recorded signal.

A particular use of the method according to the invention may be made if the possibility is desired of obtaining both a video signal coded according to the PAL-color system and a video signal coded according to the SECAM-color system without employing means for converting either system into the other. Normally this would require two separate color video signals to be recorded in two different tracks. This double recording is not necessary when using the method according to the invention, because two color carriers having mutually separated frequency bands may be used, one of these color carriers being modulated by the color signal according to the PAL-system, i.e., phase-modulated and amplitude-modulated, while the other color carrier is modulated by the color signal according to the SECAM-system, i.e., by two line-sequential frequency-modulated signals. Both color carriers may be recorded in one track together with the common modulated carrier which contains the common luminance information. For SECAM-reproduction a converter may be required for converting the audio signal which may be recorded in frequency modulation into an amplitude-modulated signal. For playback either one of the other carrier is to be utilized in accordance with the color system used.

A record carrier which is provided with video information by the method according to the invention is characterized by the presence of at least one further carrier which lies below the frequency band occupied by the modulated carrier. With respect to the display of a recorded video signal the method according to the invention has the advantage that a signal recorded by this method can be read in a manner identical with that used for reading a signal recorded by the known method, by separating the various signal components of the recorded video signal and reconverting the modulated color subcarrier and, as the case may be, the modulated audio subcarrier to their original frequency bands. When after this reconversion and demodulation of the luminance signal the various components are added the original color video signal suitable for reproduction is obtained again. If desired, this signal may be made to modulate a high-frequency carrier, thus enabling the resulting signal to be directly applied to the aerial connection of a television receiver via a twin-lead cable.

Figure 2:
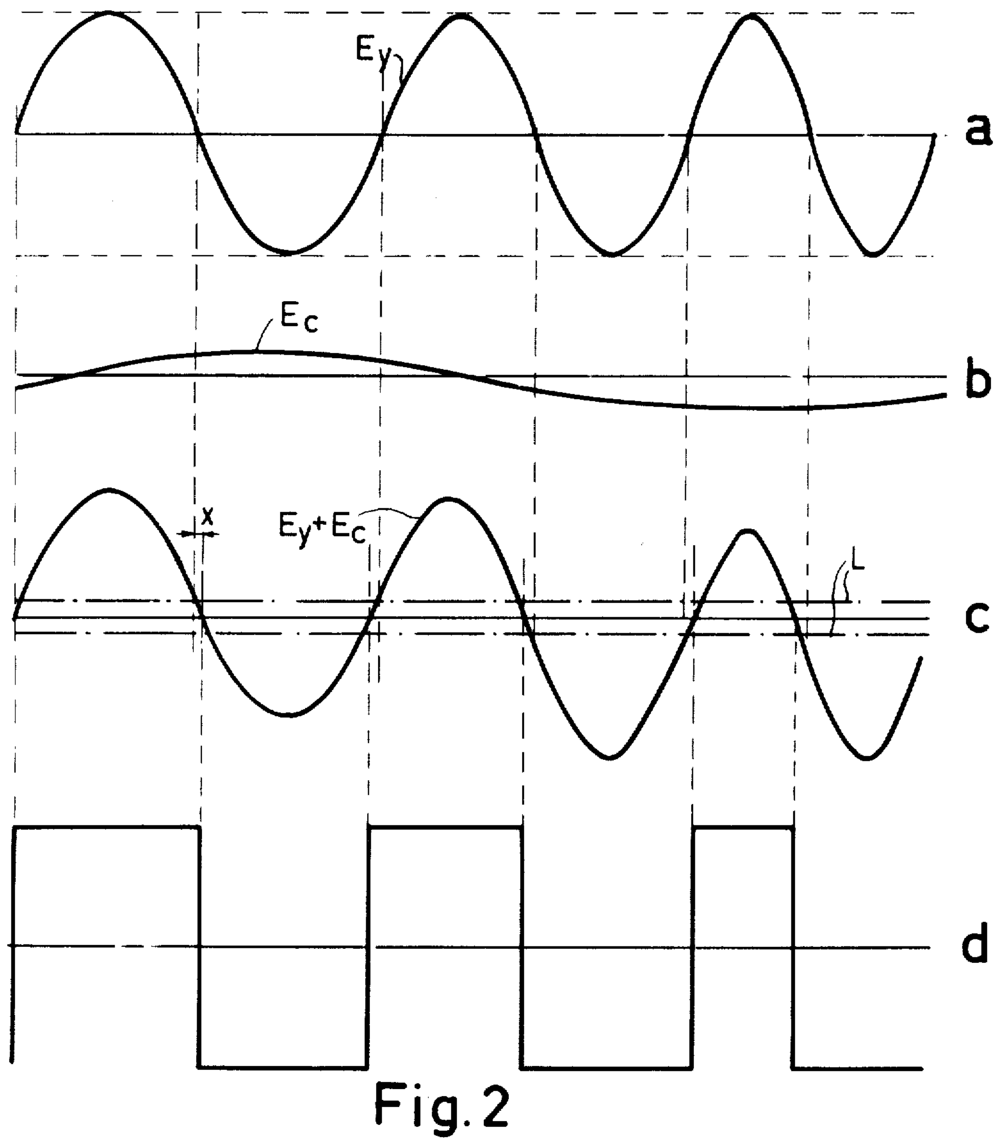
Figure 3:
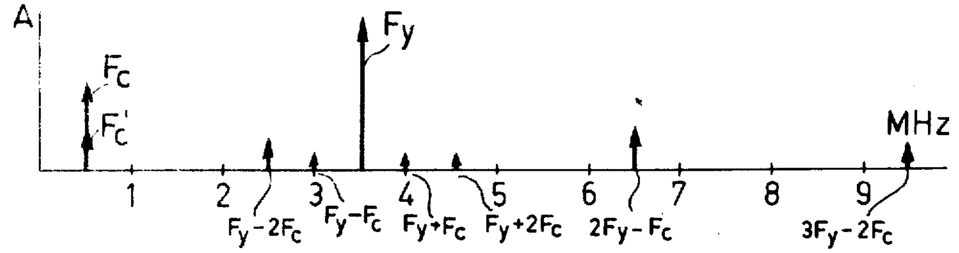
Figure 4:
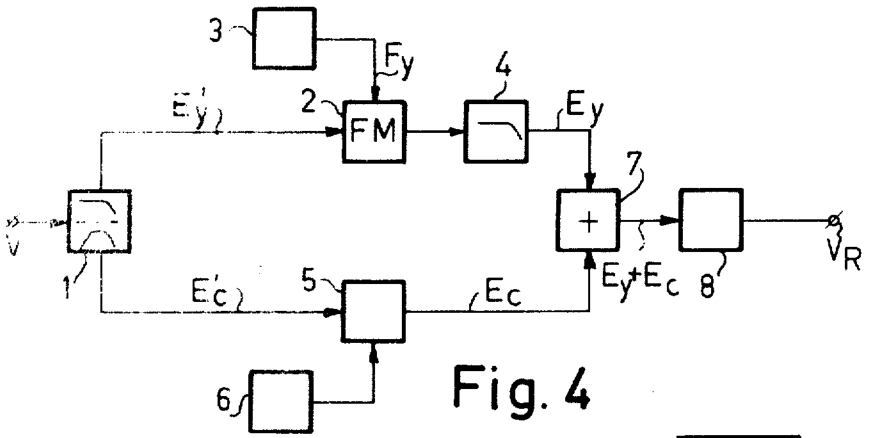
Figure 5:
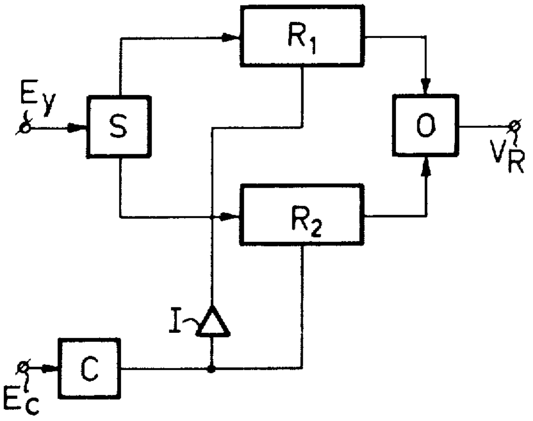
Figure 6:
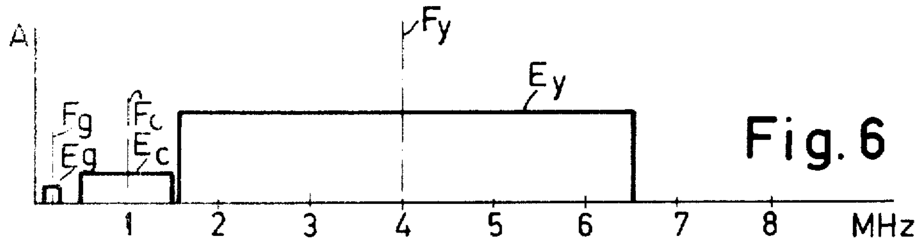
Figure 7:
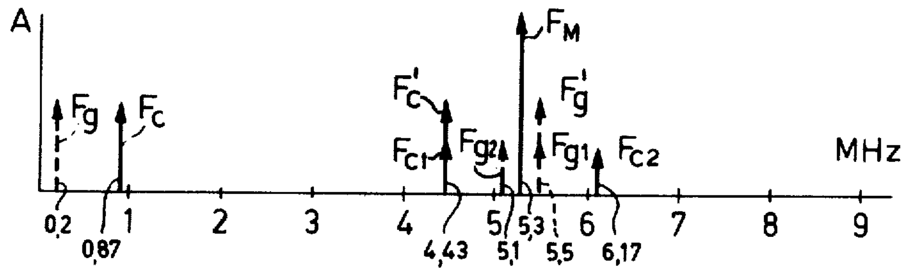
Figure 8:
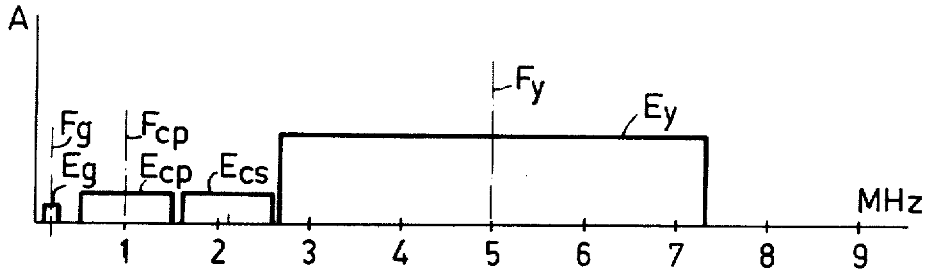
Figure 9:
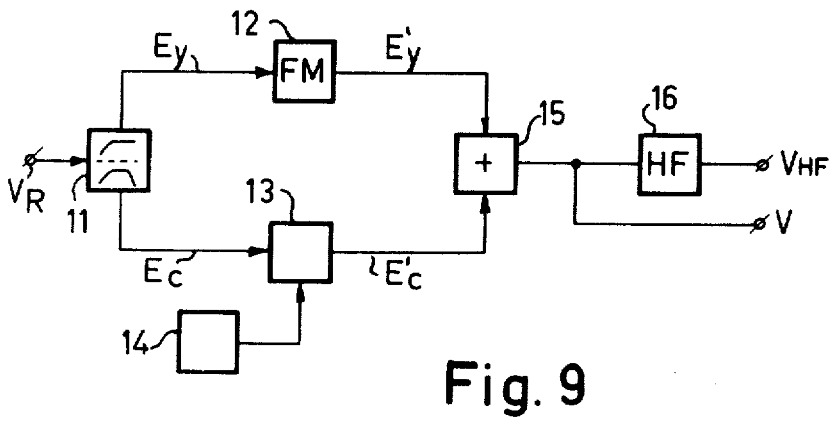

Embodiments of the invention will now be described, by way of example, with reference to the accompanying diagrammatic drawings, in which:

FIG. 1 shows a spectrum of a color video signal as recorded on a magnetic record carrier by a known apparatus, FIG. 2 shows signal wave-forms, FIG. 3 shows a signal spectrum illustrating the method according to the invention, FIG. 4 shows schematically an arrangement for carrying out the method according to the invention, FIG. 5 shows an alternative arrangement for carrying out the method according to the invention, FIG. 6 shows by way of example a spectrum of a color video signal together with the associated audio signal such as may be recorded by means of the method according to the invention, FIG. 7 shows a frequency spectrum obtained if the color signal together with the audio signal is converted by means of a common mixing signal which has a frequency intermediate the frequencies of these two signals, FIG. 8 shows a spectrum of a video signal such as may be recorded on the record carrier and capable of being read both according to the PAL-system and according to the SECAM system, and FIG. 9 shows an arrangement by means of which a record carrier provided with a video signal by the method of recording according to the invention can be reproduced.

FIG. 1 shows a spectrum of a color video signal as recorded on a magnetic tape by a known arrangement. $E_y$ denotes the spectrum of the luminance signal which is recorded on the tape and has been obtained by causing the luminance information present in the original color video signal to modulate a carrier $F_y$ in frequency. $E_c$ designates the spectrum of the color signal which is recorded on the tape and has been obtained by separating the color signal present in the original color video signal, mixing it with a mixing signal having a fixed mixing frequency and separating from the resulting signal the color signal $E_c$ modulating a carrier wave $F_c$. The mixing signal used may have a frequency which is coupled to the repetition frequency of the line synchronizing pulses of the video signal. This mixing signal may alternatively be produced by an independent oscillator, but in this case a pilot signal must be recorded on the record carrier to enable the color signal to be re-mixed to the correct frequency during reading.

For recording on the magnetic tape the color signal $E_c$ is superposed on the luminance signal $E_y$ and the entire signal is recorded on the tape, the luminance signal $E_y$, which compared with the color signal $E_c$ has a comparatively high frequency, acting as a bias magnetization signal of this color signal. Thus there is recorded on the tape a signal both the amplitude and the frequency of which vary and which contains both the color information and the luminance information. Consequently this method of recording clearly is unsuitable for record carriers which allow only two signal levels.

The method according to the invention provides a solution of this problem, which will be explained with reference to FIGS. 2 and 3.

As mentioned hereinbefore, one of the uses of the method according to the invention requires the luminance signal $E_y$ to have finitely steep edges, in contradistinction to a frequently used method in which this signal is a square-wave signal and hence has very steep edges. Preferably this luminance signal has a voltage waveform which has a constant slope over a maximum range about the zero crossings. It has been found, however, that a sinusoidal signal also sufficiently satisfies this criterion to be capable of being used in the method according to the invention. In FIG. 2a the luminance signal $E_y$ is shown as such a sinusoidal signal the frequency of which contains the luminance information.

FIG. 2b shows the color signal $E_c$ which has an amplitude considerably smaller than that of the luminance signal $E_y$. In the PAL and NTSC systems this color signal is a signal modulated both in amplitude and in phase, whereas in the SECAM system this color signal is modulated in frequency only. which color system is employed is not of importance for using the method according to the invention, because the invention may be applied in a substantially identical manner to all three systems.

The two signals $E_y$ and $E_c$ are added, resulting in the sum signal $E_y + E_c$ shown in FIG. 2c. In analogy with the known method, this sum signal is suitable for recording on a magnetic record carrier, but it is not suitable to serve as a recording signal for a disk-shaped record carrier provided only with a black-and-white pattern or a high-and-low structure, because a record carrier containing such a code does not permit of recording amplitude variations.

FIG. 2c shows, however, that owing to the use of a luminance signal $E_y$ having finitely steep edges the superposition of the color signal $E_c$ has caused a shift ($x$) of the zero crossings of this luminance signal $e_y$. The magnitude of this shift depends upon the instantaneous value of the color signal $E_c$ and also upon the value of the slope of the luminance signal $E_y$ in the vicinity of the zero crossings.

Assuming the slope of the luminance signal to be constant within an amplitude range about the zero crossings of the luminance signal which corresponds to the maximum value of the color signal $E_c$, it will be clear that the shift of the zero crossings is linearly dependent upon the instantaneous value of the color signal. This means, however, that the positions of the zero crossings of the sum signal $E_y + E_c$ define both the luminance information contained in the signal $E_y$ and the color information contained in the signal $E_c$.

The invention utilizes this recognition by recording on the record carrier a signal in which the positions of the zero crossings of the sum signal $E_y + E_c$ are uniquely determined. These zero crossings of the sum signal may be detected in various known manners. As an example the use of a level detector, for example a hysteresis-free Schmitt trigger, is mentioned which occupies a first position as soon, and as long, as the sum signal has a positive value and occupies a second position as soon, and as long, as this sum signal has a negative value. The terms "positive" and "negative" are to be understood to mean greater and smaller respectively than the "zero value" of the original luminance signal $E_y$, because owing to the presence of a direct-voltage component this "zereo value" obviously may differ from the real voltage 0.

Thus such a level detector enables a square-wave signal to be obtained of the form shown in FIG. 2*d* the zero crossings of which correspond to the zero crossings of the sum sitnal $E_y + E_c$ and which is directly suitable for use as a recording signal for a record carrier which employs a code comprising only two levels, such as the aforementioned high-and-low structure or the black-and-white pattern.

The square-wave signal suitable for recording which is shown in FIG. 2*d* may alternatively be simply obtained by applying the sum signal $E_y + E_c$, as the case may be after amplification, to a limiter which limits the applied signal, for example, to a maximum absolute value L (see FIG. 2*c*). This again enables a square-wave signal corresponding to FIG. 2*d* to be obtained.

Instead of a square-wave signal a pulsatory signal may be created and recorded on the record carrier, the pulses corresponding to the positions of the zero crossings of the sum signal.

Obviously the aforedescribed procedure does not integrally take place in reality, but is disturbed by non-linearities in the entire system. These non-linearities may be produced, for example, in the process of recording, but may also be due to the fact that the slope of the luminance signal is not entirely constant. These non-linearities give rise to mixed products of the frequency bands in the sum signal, while the conversion of the sum signal into a square-wave signal also gives rise to mixed products. However, if the various signal components are suitably chosen, these mixed products are permissible, which may best be explained with reference to the spectrum of the sum signal shown in FIG. 3 and the square-wave signal obtained from this sum signal.

For simplicity the FIG. shows only the carrier frequencies. Similarly to FIG. 1 the sum signal $E_y + E_c$ contains a carrier $F_y$ and a color carrier $F_c$. If in one exemplary embodiment of the method according to the invention this sum signal is applied to a limiter, the output signal of the limiter contains a component $F_c'$ at the same frequency and a component at a frequency which is produced by mirror-image formation with respect to $F_y$, i.e., a frequency $2F_y - F_c$. Furthermore components at frequencies $F_y \pm h(F_y - F_c)$ are produced. Finally mixed products $F_y \pm mF_c$ are produced. The components at frequencies higher than $F_y$ are not inconvenient, because in reproduction only the lower sideband of the modulated carrier $F_y$ is required and hence these components may be eliminated. It is found that most disturbance is produced by the component at the frequency $F_y - 2F_c$, since it has the largest amplitude and moreover cannot be eliminated by filtering, because it lies within the frequency band of the luminance signal. It has, however, been found that the adverse influence of this component remains within permissible limits provided that the amplitude of the modulated color carrier is not too large, for in this case the amplitude of this disturbing component also remains limited. A further alternative is to choose a color carrier frequency such that this second-order sideband $F_y - 2F_c$ lies at a frequency such that the moire pattern has a form such in the picture displayed as to give rise to minimum disturbance.

For example, in the NTSC system in this connection it would be advantageous for the color carrier $F_c$ to be such that the frequency $2F_c$ is equal to an odd number of times one half of the line frequency. In the PAL system (latest version) it is advantageous, for example, for this color carrier $F_c$ to be such that the frequency $2F_c$ is equal to an odd number of times one quarter of the line frequency plus or minus 25 Hz. This choice of the color carrier ensures that the distrubing pattern due to the second lower sideband $F_y - 2F_c$ moves diagonally across the display screen, which provides minimum inconvenience.

Apart from the mixed products produced the spectrum is found to be identical with that shown in FIG. 1, however, the amplitude of the color carrier is reduced to less than half, but this may be compensated for in display by additional amplification.

FIG. 4 shows schematically an arrangement for carrying out the method according to the invention.

A video signal *V* to be recorded, which may for example be built up according to the PAL, NTSC or SECAM system, is applied to a separating filter 1 in which by means of a bandpass filter the color signal $E_c'$ is separated from the luminance signal $E_y'$ which is obtained from the signal V via a low-pass filter. The carrier $F_y$, which is generated by an oscillator 3 and may, for example, have a square-wave form, is modulated in frequency by the luminance signal in known manner in a modulator 2. The output signal from the modulator 2 is applied to a low-pass filter 4 which has the function of ensuring that the luminance signal $E_y$ which appears at its output has finitely steep edges, and owing to its arrangement at a location succeeding the modulator also ensures that the slope of the said edges is approximately independent of the frequency of the luminance signal.

The color signal $E_c'$ separated by the separating filter 1 is converted down in known manner by mixing it in a mixer stage 5 with a mixing signal produced by an oscillator 6. This oscillator may, for example, have a frequency which is coupled to the line frequency, which simplifies subsequent reconversion of the color signal. The converted color signal $E_c$ obtained from the mixer stage 5 and the luminance signal $E_y$ are added in a summing stage 7 to give the sum signal $E_y + E_c$.

This sum signal is applied to a detector circuit 8 which detects the zero crossings of the sum signal and in relation thereto generates a square-wave signal having corresponding zero crossings, which square-wave signal $V_R$ is recorded on the record carrier. This detector circuit 8 may, for example, comprise a level detector having two possible stable states depending upon whether the applied signal exceeds or does not exceed a given limit value.

As has been mentioned hereinbefore, the detector circuit 8 may be replaced by a limiter which limits the applied signal to a given amplitude and thus delivers a signal which, as the case may be after amplification, also has a suitable square-wave form.

FIG. 5 shows a second circuit arrangement for obtaining the desired recording signal $V_R$. In this arrangement the modulated carrier $E_y$ (which may have a square-wave form) is applied to a separating stage S which separates the ascending edges of this signal from its descending edges and applies signals which correspond to these edges to two identical variable delay devices $R_1$ and $R_2$. The modulated color carrier $E_c$ is applied to a control circuit C which is connected to the control inputs of the two delay devices $R_1$ and $R_2$. To indicate that the delay periods introduced by the two delay devices vary in opposite senses in accordance with the modulated color carrier $E_c$ an inverter I is included in the connection of the control circuit C to the control input of the delay device $R_1$.

Thus the zero crossings of the modulated carrier $E_y$ are given the desired shifts by means of the two delay devices $R_1$ and $R_2$. By combining the output signals from these two delay circuits again in a combining member O the desired recording signal $V_R$ may then be obtained.

The separation of the ascending edges from the descending edges may be effected in a very simple manner by starting from twice the carrier frequency which is modulated by the luminance information. If this frequency then is divided, in this division the ascending and descending edges are already obtainable independently of one another, so that in this case the separating stage S is effectively included in the divider.

Recording the audio signal associated with the video signal may advantageously be effected in a manner identical with that used in recording the color information. For this purpose the audio signal present in the original video signal is converted to a frequency below the frequency band occupied by the luminance signal. An overall spectrum may be obtained of the form shown in FIG. 6, sound being made to modulate on a sound carrier $F_g$, so that a sound signal $E_g$ having in general a lever lower than the colour signal $E_c$ with a bandwith of, say, 75 kHz about a sound carrier of, say, 250 kHz is obtained. The addition of the sound requires the color carrier $F_c$ and the carrier $F_y$ to be shifted to slightly higher frequencies (for example to 1 MHz and 4 MHz respectively), so that altogether a slightly wider frequency band is required. Obviously the sound signal may alternatively lie between the color signal $E_c$ and the luminance signal $E_y$.

To enable the sound signal to be recorded in this manner the arrangement shown in FIG. 4 must be extended to include a mixer stage and an oscillator by means of which this sound signal, which is assumed to modulate an intercarrier frequency, is converted down, and an additional input of the adder 7, enabling a sum signal $E_y + E_c + E_g$ to be obtained.

In a practical embodiment the frequency of the color carrier was made 64 times the line frequency, i.e., 1 MHz, while the frequency of the sound carrier was 250 kHz. This coupling to the line frequency facilitates the production of the mixed frequencies required for the conversions of the color and sound signals.

As has been stated hereinbefore, starting from a standard color video signal enables the sound signal to be converted down by means of the same mixing signal as used for the conversion of the color signal. In a PAL color system in which the color signal modulates a standard color carrier of 4.43 MHz, this means for a standard sound carrier of 5.5 MHz that after conversion by means of a mixing signal at a frequency higher than 5.5 kHz the sound and color carriers also have a frequency spacing of 5.5 − 4.43 = 1.07 MHz. This spacing is greater than the required minimum, which may mean a waste of bandwidth.

To obviate this disadvantage the mixing signal may be chosen to lie between the standard color carrier (4.43 MHz) and the standard sound carrier (for example 5.5 MHz), as illustrated in the spectrum shown in FIG. 7. In this Figure the standard color carrier is denoted by $F_c'$ and the standard carrier by $F_g'$. The mixing signal $F_M$ is chosen to have a frequency of 5.3 MHz. After the standard color and sound carriers $F_c'$ and $F_g'$ have been mixed with the mixing signal $F_M$ the color carrier $F_c$ and the sound carrier $F_g$ (folded-over lower sideband) are produced which are situated at 0.87 MHz and 0.2 MHz respectively. These carriers are spaced by only 0.7 MHz, so that the available bandwidth is used to a considerably better account, the minimum permitted spacing between two frequency bands even being approximated to.

In the process of recovering the color carrier and the sound carrier in the display of the recorded video signal there is produced in addition to the desired standard color carrier $F_{c1}$ at 4.43 MHz an upper sideband $F_{c2}$ which lies at a frequency of 6.17 MHz and hence may simply be eliminated. In addition to the desired upper sideband of the standard sound carrier at 5.5 MHz recovery also produces a lower sideband at 5.1 MHz. The latter may be eliminated together with the mixing signal $F_m$ by means of a band-pass filter.

FIG. 8 shows by way of example a spectrum such as may be used to record a color video signal which may be played back both by means of a receiver operating according to the PAL system and by means of a receiver operating according to the SECAM system, without signals *PAL/SECAM* converter being required. For this purpose the spectrum contains both a color carrier $F_{cp}$ modulated by a color signal according to the PAL system and a color carrier $F_{cs}$ modulated by a color signal according to the SECAM system. The two signals $E_{cp}$ and $E_{cs}$ are superposed, as the case may be together with a sound signal, on the modulated carrier $E_y$ and further processed in a manner as described hereinbefore. Depending on the tupe of the receiver used in playback either the signal $E_{cp}$ or the signal $E_{cs}$ is retransferred to the appropriate frequency band, while the undesired color signal is eliminated.

FIG. 9 shows an arrangement for playback of information recorded on a record carrier by a method according to the invention. The signal $V_R$ read from the record carrier is applied to a separating filter 11 in which the various signal components are separated (in the example shown the luminance component $E_y$ and the color component $E_c$ only). The luminance component is applied to a demodulator 12 in which the luminance signal $E_y'$ is demodulated from the modulated carrier $E_y$. The color component $E_c$ is applied to a mixer stage 13 to which is also applied a mixing signal produced by an oscillator 14. Mixing produces the color signal $E_c'$ which is situated in the frequency band associated with the respective color system. This color signal $E_c'$ is added to the luminance signal $E_y'$ and the resulting signal V may be applied to a suitable input of the receiver. By applying this sum signal V to a stage 16 in which it is caused to modulate a high-frequency carrier a signal $V_{HF}$ is obtained which may directly be applied to the aerial input of the receiver via a twin-lead cable.

When the signal $V_R$ read from the record carrier also contains sound information situated in a separate frequency band, which information may relate to monophonic, stereophonic or even quadrophonic sound, this frequency band or bands also must be separated by the filter 11, and subsequently the sound signal also must be reconverted in a manner corresponding to that described with respect to the color signal. For this reconversion the mixing signal produced by the oscillator 14 may be used, if the stepping-down process the same mixing frequency has been used.

The mixing frequency produced by the oscillator 14 may be coupled to the line frequency or to the frequency of the standard color carrier (4.43 MHz in the PAL system).

We claim:

1. Method of recording a video signal, in particular a color video signal, on a record carrier, which comprises frequency modulating a carrier with the luminance information of the video signal, modulating a further carrier which lies below the frequency band of the modulated carrier by a further associated information component, shifting the zero crossings of the ascending and descending edges of the modulated carrier in mutually opposite dependence upon the modulated further carrier (or further carriers), and recording the shifted zero crossings of the modulated carrier on the record carrier as the information-containing quantities.

2. Method as claimed in claim 1, wherein the modulated carrier has finitely steep edges and wherein the step of shifting the zero crossings of the modulated further carrier comprises the step of adding the modulated further carrier to this modulated carrier to form a sum signal the zero crossings of which are recorded on the record carrier as the information-containing quantities.

3. Method as claimed in claim 2, wherein the or each modulated further carrier are added to the modulated carrier in an amplitude ratio such that the zero crossings of the modulated carrier are shifted in an at least approximately linear dependence upon the or each modulated further carrier.

4. Method as claimed in claim 2 further comprising the step of passing the modulated carrier through a low-pass filter before the modulated further carrier is added to it.

5. Method as claimed in claim 2 further comprising the step of applying the sum signal to a limiter which bilaterally limits the sum signal.

6. Method as claimed in claim 1, wherein the step of recording on the record carrier comprises recording on the record carrier a signal which always has one of the two possible values and the transitions of which correspond to the said zero crossings.

7. Method as claimed in claim 1, wherein the further carrier is modulated by the color information of the video signal.

8. Method as claimed in claim 7, further comprising the step of adding to the modulated carrier a subcarrier which lies outside the frequency band occupied by the modulated further carrier.

9. Method as claimed in claim 8, based on a standard color video signal containing a color signal and a sound signal which modulates an intercarrier, wherein a modulated color carrier and a modulated sound carrier are obtained by mixing the color signal and the sound signal contained in the standard color video signal with a common mixing signal.

10. Method as claimed in claim 9, wherein the frequency of the mixing signal lies between the frequency bands of the standard color video signal occupied by the color signal and the sound signal.

11. Method as claimed in claim 9, wherein the frequency of the mixing signal is chosen so that during recording non-linear effects and second-order sidebands have minimum disturbing influences on the picture displayed.

12. Method as claimed in claim 7, wherein two color carriers are present in discrete frequency bands which are modulated by the same color information, the color signal included in one of these color carriers being suitable to be displayed according to the PAL color system, while the color signal included in the other color carrier is suitable to be displayed according to the SECAM color system.

13. Method as claimed in claim 1, wherein the further carrier is modulated by the sound information of the video signal.

14. Apparatus for recording a color video signal on a record carrier comprising means for frequency modulating a carrier with the luminance information of a video signal, means for modulating a further carrier which lies below the frequency band of the modulated carrier by a further associated information component, means for shifting the zero crossings of the ascending and descending edges of the modulated carrier in opposite dependence upon the or each modulated further carrier and means for recording the information on the record carrier.

15. Apparatus as claimed in claim 14, wherein it is provided with an adder having a plurality of inputs to a first one of which the modulated carrier and to at least one further one of which the or each modulated further carrier is applied, and at an output of which the sum signal appears which is applied to the recording means.

16. Apparatus as recited in claim 14, further comprising a low-pass filter to which the modulated carrier is applied, and an adder having a first input connected to the output of the filter and having a plurality of further inputs to which the or each modulated further carrier is applied and at the output of which the sum signal appears which is applied to the recording means.

17. Apparatus as recited in claim 14, comprising an adder having a plurality of inputs to a first one of which the modulated carrier is applied and to at least one further input of which the or each modulated further carrier is applied, and a limiter the output of which is connected to a recording member and an input of which is connected to the output of the adder.

18. Apparatus as recited in claim 14, further comprising an oscillator means for producing a mixing signal, a plurality of mixing stages, means for applying the various color and sound signals contained in the standard color video signal and the mixing signal to the mixer stages, and an adder connected to the output signals of the mixing stages which delivers a sum signal which is applied to the recording member.

19. Record carrier produced by the method claimed in claim 1, wherein the carrier contains an information track which either is substantially circular and comprises blocks of constant height separated by intermediate spaces, the variation in the lengths of the blocks and/or of the intermediate spaces corresponding to the video information.

20. Apparatus for playback of a record carrier wherein color video information is recorded in the form of frequency modulated luminance signals where the ascending and descending edges of the modulated luminance signals are oppositely shifted in response to additional lower frequency modulated signals, comprising a separating filter for separating the carrier and the or each further carrier, a demodulator for demodulating the carrier, at least one mixing stage, the or each mixing stage being associated with an oscillator for reconverting the or each further carrier to a frequency band suitable for playback, and an adder to which the demodulated carrier and the or each reconverted further carrier are applied.

* * * * *

UNITED STATES PATENT AND TRADEMARK OFFICE

CERTIFICATE OF CORRECTION

PATENT NO. : 3,893,163

DATED : July 1, 1975

INVENTOR(S) : JOHANNES HENDRIK WESSELS and WILLEM VAN DEN BUSSCHE

It is certified that error appears in the above-identified patent and that said Letters Patent are hereby corrected as shown below:

IN THE CLAIMS

Claim 2, line 3, cancel "fur-";

line 4, cancel "ther";

Claim 19, line 3, cancel "either".

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*